Dec. 7, 1937. A. LANGSNER 2,101,077
SPIRIT LEVEL AND MOUNTING
Filed Nov. 2, 1934 2 Sheets-Sheet 1
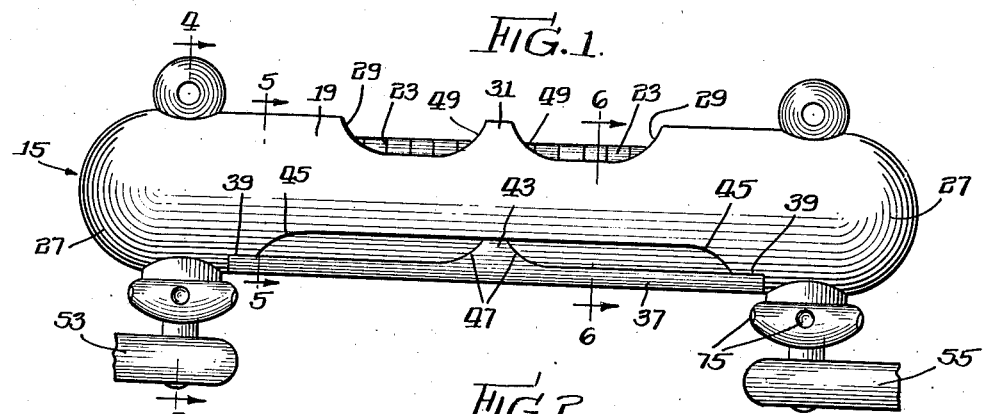
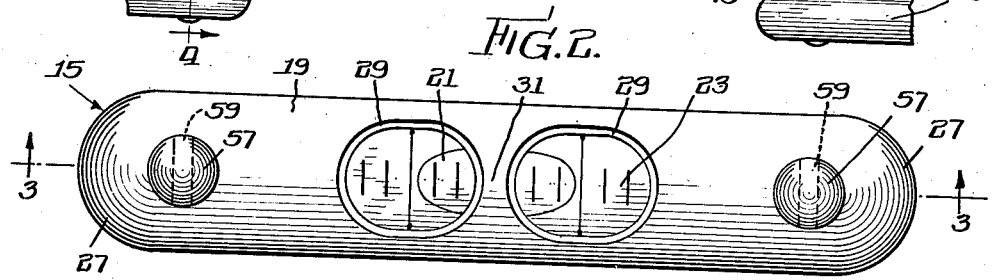
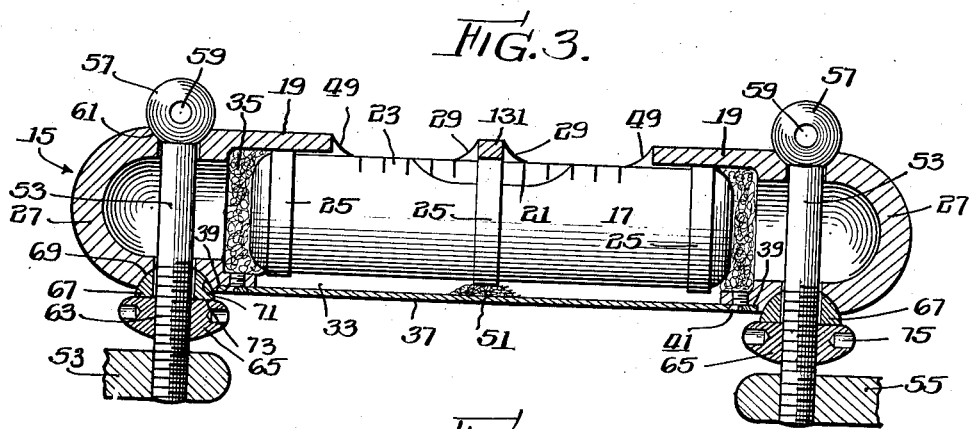
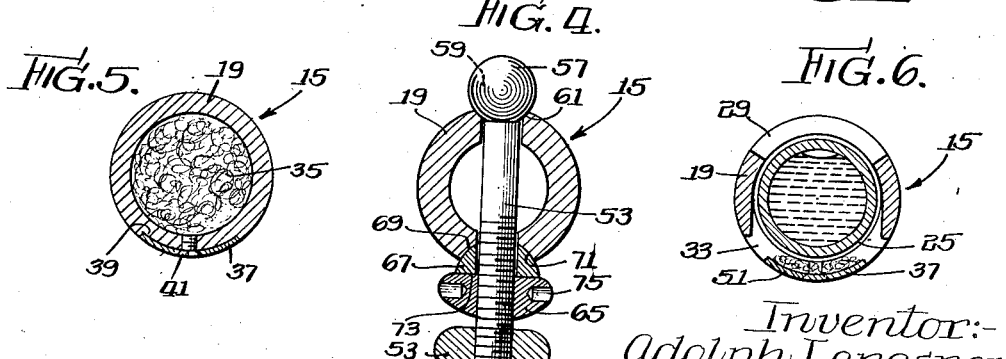
Inventor:-
Adolph Langsner
By:- Cox x Moon attys.

Dec. 7, 1937.   A. LANGSNER   2,101,077
SPIRIT LEVEL AND MOUNTING
Filed Nov. 2, 1934   2 Sheets-Sheet 2
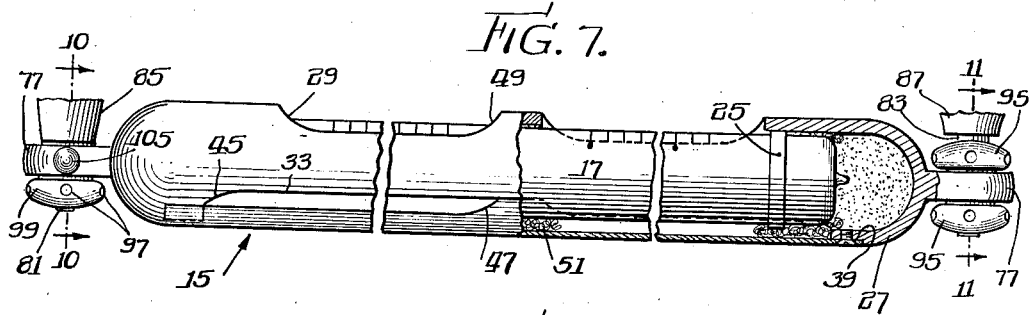
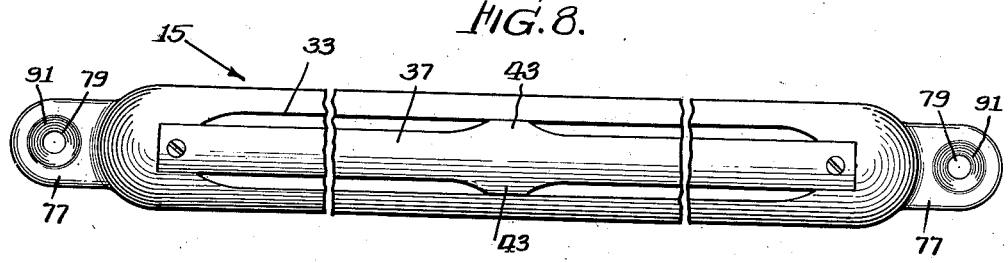
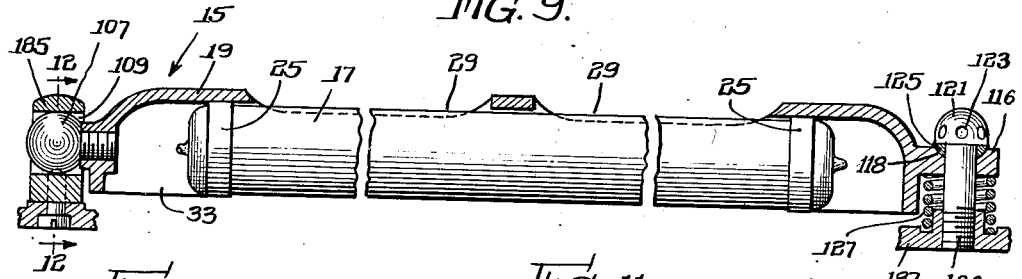
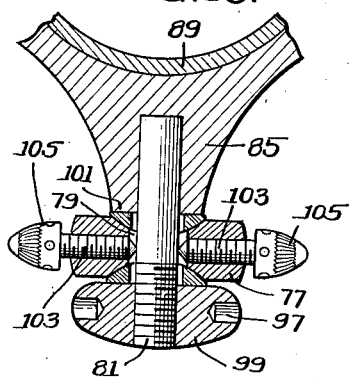
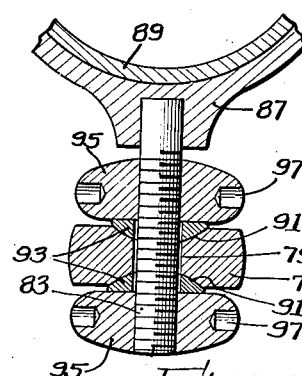
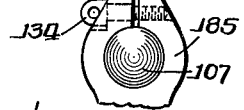
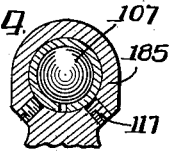
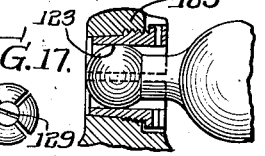
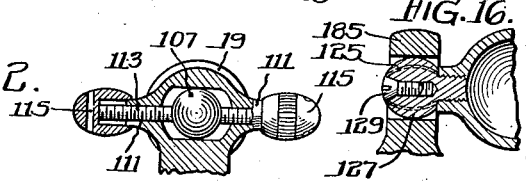
Inventor
Adolph Langsner
By: Cox & Moore attys.

Patented Dec. 7, 1937

2,101,077

UNITED STATES PATENT OFFICE 2,101,077

SPIRIT LEVEL AND MOUNTING

Adolph Langsner, Chicago, Ill., assignor to Eugene Dietzgen Company, Chicago, Ill., a corporation of Delaware Application November 2, 1934, Serial No. 751,241

20 Claims. (Cl. 33—73)

My invention relates in general to spirit levels and means for mounting and adjusting the same.

An important object is to provide a spirit level including a vial and vial housing of simplified and improved construction whereby the vial may be quickly and easily, yet securely, assembled in the housing and as easily removed therefrom for repair and replacement.

A further object is to provide an inexpensive vial housing of streamlined configuration to improve its appearance and to reduce wind resistance where used in precision measuring instruments such as transits, levels, and the like.

A still further object is to provide a vial housing having an opening through which the vial may be introduced into the housing and a cover for the opening wherein the edges of the opening and of the cover co-operate to improve the external appearance of the housing while at the same time provide for ventilating the housing, the housing, at the edges of the opening, providing a snug bearing seat for the cover at intervals and the cover being curved to strengthen the same, the support afforded the cover by the seat in conjunction with the curved configuration of the cover enabling the cover to be made of relatively light stock and to be fastened in place on the housing at a minimum number of points.

Another important object is to provide a mounting for the spirit level including means whereby the same may be adjusted to a desired angularity in the mounting.

Another object is to provide for adjusting one end of a mounted spirit level to adjust an axis of the same with respect to the horizontal.

Another object is to provide for shifting one end of a mounted spirit level horizontally to adjust the axis of the level in a desired alignment in a horizontal plane.

Another object is to provide for adjusting one end of the spirit level vertically and the other end horizontally.

Another object is to provide a ball and socket mounting at one end of a vial housing whereby the axial alignment of the device may be controlled by shifting the other end of the same.

Another object is to provide a ball and socket mounting to permit the housing to be universally tilted in its mounting; a still further object being to permit the center of universal tilting to be shifted.

A further object is to form the parts of the adjusting mechanism with a streamlined configuration to reduce wind resistance and improve the appearance of the device.

Another important object is to provide an instrument, including a vial and vial housing, facilitating assembly of the vial in the housing and an adjustable mounting for the housing providing for the swiveling of the housing on its mounting in order to adjust the same; a further object being to mount the housing at spaced apart points and to provide for adjustably shifting the housing at one mounting point while permitting the same to swivel at the other mounting point.

Another important object is to provide an instrument comprising a telescope having a vial housing containing a spirit level adjustably mounted on said telescope, said housing being secured on a saddle comprising a member embracing the barrel of the telescope.

Another object is to provide an instrument, including a spirit level vial and a vial housing for said vial, the housing being of one piece, thus avoiding the conventional ends on each side of the vial tube making the delicate part of adjustment more substantial and embodying a sheet metal element at a lateral opening in the underside of the casing to which the vial may be assembled in the housing and said sheet metal element supplying the cover for said opening.

Another important object is to provide an instrument including a spirit level vial and a housing for said vial, having an opening on the underside for the purpose of inserting the vial, and a sheet metal element to cover said opening and so constructed that it also provides additional side openings to permit a free circulation of air over and underneath the glass vial, but, nevertheless, provides enough protection.

Numerous other objects and advantages of the invention will be apparent from the following description, which, taken together with the accompanying drawings, discloses preferred embodiments of the invention.

Referring to the drawings:

Figure 1 is a side view and Figure 2 a top view of a vial housing and mounting embodying my invention;

Figures 3 and 4 are sectional views taken substantially along the line 3—3 and 4—4 in Figures 2 and 1 respectively;

Figures 5 and 6 are sectional views taken substantially along the lines 5—5 and 6—6 respectively in Figure 1;

Figure 7 is a side view, partially in section, of a vial housing and mounting embodying my invention;

Figure 8 is a bottom view of a vial housing embodying my invention;

Figure 9 is a sectional view showing a modified form of the invention;

Figures 10 and 11 are sectional views taken substantially along the lines 10—10 and 11—11 respectively in Figure 7;

Figure 12 is a sectional view taken substantially along the line 12—12 in Figure 9;

Figures 13, 14, 15, and 16 are sectional views taken along the line 12—12 in Figure 9 to show modified forms; and Figure 17 is an end view of a part shown in Figure 16.

To illustrate my invention, I have shown on the drawings, spirit levels 15 comprising each a vial 17 and a vial housing 19, and mounting means for the vial and housing.

The vial 17 preferably comprises a cylindrical capsule of transparent material, such as glass, containing a liquid almost completely filling the capsule in order to define an air bubble 21 adapted to shift in the capsule as the same is tilted. The upper side of the capsule may be graduated as at 23 if desired. The capsule also may be encircled by resilient buffer bands 25. The vial housing preferably comprises a cylindrical shell, the internal diameter of which is formed to snugly receive the vial 17 with the buffer strips 25 assembled thereon. The housing 19 has preferably rounded ends 27 to improve its appearance and also to reduce wind resistance where the vial and housing are assembled on an instrument for out of door use. The upper surface of the housing is provided with a pair of spaced openings 29 lying on opposite sides of the mid-portion of the housing, the openings being separated by an integral part 31 of the housing which extends therebetween.

The vial is assembled in the housing so that its graduated portions 23 extend opposite said openings and the air bubble 21 is preferably of such dimension that its opposite ends extend, when the vial and its housing are in horizontal position, substantially to the central graduation of the scale appearing in each of the openings 29. If the vial and its housing, however, are tipped from the horizontal, the bubble will extend a greater distance in one opening than in the other, which fact may readily be gaged by inspecting the relative position of the ends of the air bubble with respect to the graduated ends disposed in the opening 29. The housing 19 on its side vertically opposite from the openings 29 is formed with an elongated opening 33 wide enough to permit the vial and assembled buffer bands 25 to be inserted into the casing through the opening 33. The opening 33 preferably has a length approximately equal to the length of the vial although if desired the length of the opening may be slightly shorter than that of the vial to be assembled in the housing. In such case the vial may be assembled in the housing by inserting one end thereof through the opening 33 and into one end of the housing a distance sufficient to permit the opposite end of the vial to clear the opposite end of the opening 33 so that said opposite end of the vial may be swung into position within the housing and the vial shifted axially in order to align the same centrally with respect to the openings 29.

Suitable filling material 35 may be arranged in the ends of the housing in order to snugly receive the opposite ends of the vial and hold the same in position. I provide a cover 37 for closing the opening 33 after the vial has been assembled. The cover 37 comprises a strip of material of length slightly greater than the length of the opening 33, said strip having ends adapted to extend in depressed seats 39 formed in the housing at the opposite ends of the opening 33 so that the outer surface of the cover 37 lies flush with the surfaces of the housing 19. The cover 37 is held in place by means of small screws 41, which penetrate perforations at the opposite ends of the cover strip and thread into sockets formed in the bottom of the seats 39. The heads of the screws 41 are preferably countersunk in the cover strip 37 and lie substantially flush with the outer surface thereof. The cover strip 37 is preferably curved to conform with the cylindrical shape of the housing 19 and is or may be slightly narrower in width than the width of the opening 33. The cover strip also is or may be provided with a pair of ears 43 extending from the opposite side edges of the strip at substantially its mid-point, said ears projecting a distance sufficient to engage the opposite edges of the opening 33 and thus brace the curved strip in the opening. The lateral openings defined between the sides of the strip and the sides of the openings provide ventilation for the interior of the housing, while the outstanding ears 43 brace and strengthen the strip while maintaining it in position covering said opening. The particular form of the openings, thus defined between the strip and the edges of the opening 33, providing the corners of the opening 33 are rounded as at 45 and the sides of the ears 43 are likewise rounded as at 47, are of attractive shape and impart a streamlined effect, which improves the appearance of the vial housing. I prefer to curve these edges in such a way as to conform substantially in appearance, in side elevation, with the curves 49 made at the ends of the openings 29 in order to thus improve the appearance of the vial housing.

Resilient material 51 may be applied at the inner surface of the cover member 37 opposite the ears 43 in order to afford support under the mid-portion of the vial.

The vial and its housing, according to my present invention, may be made in any suitable or convenient size for various purposes, and may be mounted in any desired position. I have also provided novel means whereby the elevation of one or both ends of the housing may be varied in order to adjust the tilted position of the device on its mounting.

In Figures 1, 2, and 3, I have shown the vial and housing carried by pins 53 penetrating the walls of the housing at the opposed ends thereof, each pin being threaded at one end in a frame portion 55, such as the frame of a transit on which the spirit level is or may be mounted. The opposite end of each pin is formed preferably as a spherical knob 57, which is perforated to provide a diametral channel 59 adapted to receive a shaft to facilitate turning the shaft in threading the same into the frame portion 55.

The spherical head of each shaft 53 normally rests in a seat 61 formed in a side of the housing 19 and the lower end of each pin projects from the lower side of the housing and is threaded as at 63 to receive a clamping nut 65. The shaft preferably carries a washer 67 having a conical surface 69 adapted to rest in a seat 71 formed on the side of the housing opposite from the seat 61. The washer 67 also has a flat side adapted to rest on the clamping nut 63. This arrangement permits the housing to rock on the spherical surface of the washer as the pin is lowered or raised in the frame 55 by rotating the pin 53. The openings, through which the pin 53 extends, in the housing wall and in the washer are large enough to permit the parts to adjust themselves to a proper relative position as the housing is adjusted downwardly or upwardly with the pin, it being understood that only very slight axial movement of the pin is usually required in order to properly align the housing in horizontal position.

The housing, of course, is normally snugly seated on and clamped in adjusted position by and between the spherical surfaces of the washer 67 and the ball 57. When the spirit level is adjusted, the clamping nut 65 may be loosened to permit the ball 57 to leave its seat 61 and to release the pin for free turning movement in the threaded socket of the frame.

The clamping nuts 65 are preferably of streamlined form and are provided with preferably radial sockets 75 to facilitate turning by means of a pin. Alternately, the peripheral surfaces of the nuts 65 as well as the periphery of the knobs 57 may be knurled to permit manual operation of the parts, or knurling may be provided in addition to the sockets 75 and radial channels 59.

In Figures 7 through 12, I show mountings by which the elevation of the ends as well as the lateral displacement of the ends of the spirit level may be adjusted on the mountings.

In the embodiment shown in Figures 7 and 8, the housing is provided at its opposite ends with axially projecting lugs 77. The lugs are provided with perforations 79 adapted to receive posts 81 and 83 extending from spaced mountings 85 and 87 on and between which the spirit level is or may be mounted. The mountings 85 and 87 may comprise spaced portions of a sighting device, such as a telescope for a so-called Y level, or may simply be spaced portions of the frame of any instrument in which it is desired to mount the spirit level. The spirit level also may be secured on the parts 81 and 83 in position either facing away from or facing toward the member on which it is mounted. For example, when the spirit level is attached to a Y level telescope, it may be desirable to arrange the spirit level with its openings 29 facing the telescope on which the spirit level is mounted while, if mounted on the support frame of a dumpy level, it is desirable to arrange the level so that its openings 29 face away from the frame on which the spirit level is carried.

The support means shown in Figures 10 and 11 is particularly adapted for use in attaching the spirit level on a telescope of a Y level and is so illustrated although it is obvious that the form of support may be applied in mounting the spirit level on other than a Y level telescope.

As shown in Figures 10 and 11, the mounting comprises posts 81 and 83 carried on and projecting from pedestals 85 and 87, which may be mounted in spaced position on the barrel 89 of a telescope.

The lugs 77 of the spirit level housing are mounted on the posts 81 and 83, which penetrate the openings 79. The opposite faces of the lugs at the openings 79 are preferably countersunk to provide substantially spherical sockets 91 adapted to receive the correspondingly shaped spherical surfaces of washers 93, which are mounted on the posts on opposite sides of the lugs and the housing 19 may be adjusted to a desired position on the mounting by adjusting the position of the lug at one end of the housing on its post. The adjusted altitude of the lug is determined on at least one of the posts by a pair of nuts 95 threaded on the post on opposite sides of the lug in position to engage the outwardly facing surfaces of the washers 93. The nuts 95 may be and preferably are similar in shape to the adjusting nuts 65 previously described and are or may be provided with sockets 97, or peripheral knurling, or both to facilitate turning of the same. If desired, a pair of adjusting nuts may be provided at the other end of the housing but this is ordinarily not necessary and I prefer to utilize one nut 99 threaded on the end of the post 81 in order to clamp the lug and the washers against a shoulder 101 formed on the pedestal 85.

Either or both of the lugs 77, and preferably that one which is carried by the post 81 and held in place by the nut 99, is provided with means to adjust the position of the lug laterally with respect to the post in order to position the spirit level laterally on its mounting. Ordinarily it is necessary to provide for the lateral adjustment at but one end of the housing and so I have shown the lateral adjustment means only on the lug 77, which is mounted on the post 81. It will be appreciated, however, that similar adjusting means may be also applied on the lug carried by the post 83. The lateral adjusting means comprises a pair of adjusting screws 103 threaded into and through the lug from its opposite edges, said screws having points entering the perforations 79 of the lug on opposite sides of the post extending therein. By tightening one screw and loosening the other, the lug may be shifted laterally in either direction with respect to the post in order to alter or adjust the alignment of the housing between the posts 81 and 83, it being understood that the housing, when laterally adjusted at one end, will pivot about the post on which it is mounted at its other end. The ends of the screws 103, which project at opposite sides of the lug, are provided with preferably streamlined heads 105 as shown in Figure 8 and these heads may be knurled and/or provided with channels for the reception of a pin to facilitate turning the same in order to accomplish the lateral adjustment of the housing on its mounting.

In Figures 9 and 12, I have shown a modified mounting, in which the housing 19, at one end, is provided with a spherical knob 107, which may be formed integral with the housing or threaded into the end of the housing as shown in Figure 9. The pedestal 185, which corresponds with the pedestal 85 of the mounting previously described, is formed with an opening adapted to receive the knob 107 so that the housing has a substantially universal swiveling action in the pedestal. The opening 109 may be cylindrical and of a diameter to snugly receive the ball 107.

I may provide means to ensure that the ball is at all times snugly held in the opening even after the parts become worn in service. This may be accomplished as shown in Figure 14 by providing one or more adjusting screws 117 having inner ends adapted to bear on the surfaces of the ball or on a split sleeve enclosing the ball and outer ends for adjusting the screws in the pedestal 185. If desired, a spring pressed bearing block may be substituted for one of the screws 117.

Alternately, as shown in Figure 13, the pedestal portion containing the opening 109 may be split as at 119 and a threaded adjusting element 121 applied to adjust the pedestal about the knob. The ball may be snug in its socket by forming the socket 109 with a taper and applying a split ring 123 threaded into the tapered socket as shown in Figure 15. The split ring receives the ball and its tightness about the ball will be determined by the distance it is threaded into the socket, or I may form the ball 107 as a core 125 carrying a split casing, the diameter of which is determined by a screw 129 threading into the core, as shown in Figures 17 and 18, the socket size being constant. However, as shown in Figure 12, I may form the opening 109 as an elongated slot having opposed upper and lower sides to snugly receive the knob 107 therebetween and preferably curved ends. The pedestal also may be provided with outwardly extending embossments 111 opposite the curved surfaces of the slot, which bosses are threaded to receive adjusting screws 113, the inner ends of which enter the openings 109 on opposite sides of the ball and have ends adapted to snugly engage the spherical surfaces thereof. The outer ends of the screws 113 are or may be provided with heads 115 of preferably streamlined or tear-drop configuration in order to adjust the position of the screws in the pedestal whereby to afford the lateral adjustment of the knob in its slot in a manner comparable to the adjustment provided by the screws 103 heretofore described. The knobs 115, of course, may be knurled and/or provided with perforations for receiving a turning instrument to facilitate manipulation of the screws 113. The housing 19, if provided at one end with the mounting illustrated in Figures 9 and 12, may have, at its other end, a mounting of any suitable character, such as that shown in Figure 11. Such mounting, in the event that the knob 107 is received in a cylindrical channel 109, with no means provided for lateral adjustment of the knob in the pedestal, may also provide for lateral adjustment of the housing at its end opposite the knob.

In Figure 9, however, I have shown a modified form of adjustable mounting for the end of the housing 19 opposite from the ball, although, of course, the mounting shown in Figure 9 at the right hand end of the housing is not necessarily restricted to use in conjunction with a housing having a ball type mounting at its opposite end but may be used in conjunction with any other form of mounting, such, for instance, as the mounting shown in Figure 10.

The combination of a ball type mounting at one end of the housing with a mounting as shown at the right hand end of the housing in Figure 9, is, however, particularly well suited for use in supporting a spirit level on the frame of a so-called dumpy level, in which the pedestals 185 and 187, shown in Figure 9, comprise embossments formed on the frame of the dumpy level while the housing 19 is mounted on said pedestals 185 and 187 with the openings 29 thereof facing upwardly away from the part of the dumpy level frame on which the spirit level is mounted. The vertically adjustable mounting, shown in Figure 9, contemplates a lug 116 projecting at the end of the housing 19, said lug being perforated and formed, at least on one side, with a spherical seat 119 at said perforation. The perforation relatively loosely receives a stud 120, one end of which threads into the pedestal 187. The pedestal 187, of course, corresponds with the pedestal 87 of the mounting previously described. The stud 120 has a preferably streamlined head 121, which is or may be provided with means, such as the sockets 123, to facilitate turning of the stud, and a washer 125, having a spherical surface adapted to rest in the seat 119 and an oppositely facing bearing surface, adapted to engage the head 121, is arranged on the shaft of the stud between the head 121 and the lug 117. A spring 127 or other suitable holding means also is or may be assembled around the shaft of the stud between the lug 117 and the pedestal 187 and functions to yieldingly urge or otherwise clamp the lug 117 axially on the stud against the head 121. By turning the stud, the distance between the lug and the pedestal may be varied in order to adjust the angularity of the spirit level with respect to the base on which it is mounted.

Although the housing 19, illustrated in Figure 9, is of a form particularly adapted for mounting in a so-called dumpy level, it will be obvious that the support means, shown at opposite ends of the housing, may be applied to housings of the character shown in Figures 7 and 8 wherein the lower housing opening 33 is provided with a ventilated cover 37.

The spirit level of my present invention is of attractive appearance. The vial may be readily assembled in the housing and as easily removed and replaced in case of breakage, and I have also provided adjustable means for mounting the spirit level in accurately aligned position with respect to the frame or base on which it is mounted, whether said frame comprises a telescope or the frame of a surveying or other instrument on which it is desired to mount the spirit level.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the forms herein described being merely for the purpose of illustrating the invention.

Having thus described my invention what I claim as new and desire to secure by Letters Patent is as follows:

1. A spirit level comprising a substantially cylindrical vial and a housing in which said vial is mounted, said housing comprising a cylindrical shell provided with spaced openings on one side and an elongated opening on the opposite side, and a removable cover for said elongated opening, said cover comprising a strip of less width than said elongated opening and secured at its opposite ends on said shell and having lateral ears extending to and engaging the opposite side edges of said elongated opening.

2. A spirit level comprising a substantially cylindrical vial and a housing in which said vial is mounted, said housing comprising a cylindrical shell provided with spaced openings on one side and an elongated opening on the opposite side, and a removable cover for said elongated opening, said cover comprising a strip of less width than the elongated opening and secured at its opposite ends on said shell, said strip being formed with lateral ears at its approximate middle which extend to and bear upon the side edges of said elongated opening whereby to brace the strip on said shell intermediate the ends of the strip.

3. A spirit level comprising a substantially cylindrical vial and a housing in which said vial is mounted, said housing comprising a cylindrical shell provided with spaced openings on one side and an elongated opening on the opposite side, and a removable cover for said elongated opening, said cover comprising a strip of less width than said elongated opening and secured at its opposite ends on said shell and having lateral ears extending to and engaging the opposite side edges of said elongated opening, said cylindrical shell having spaced mounting portions at its opposite ends, at least one of which mounting portions comprises a spherical seat adapted to receive a spherical portion of a housing mounting.

4. A spirit level comprising an elongated element having spaced mounting portions, anchor means for connecting said mounting portions on support means, at least one of the mounting portions comprising a perforated part of said elongated element, said perforated part being formed with a spherical socket and its associated anchor means comprising a threaded post mounted on said support means, a threaded nut on said post supporting the elongated element adjustably on the post, and spherical means carried by said nut and seating in the socket of said perforated part whereby to permit swivelling action between the elongated element and the anchor means.

5. A spirit level comprising an elongated element having spaced mounting portions, anchor means for connecting said mounting portions on support means, at least one of said mounting portions having a perforation forming a spherical seat and its associated anchor means comprising a threaded post adapted for mounting on the support means in position extending in the perforation, threaded means on the post carrying spherical means in position to engage said spherical seat, and means girdling said post to hold the spherical means on the seat for the purpose of securing said mounting portion on said post.

6. A spirit level comprising an elongated element having spaced mounting portions, anchor means to connect said mounting portions on support means, at least one of the mounting portions comprising a perforated portion of the elongated element forming a spherical seat on one side of said portion and said adjusting means comprising a stud threaded in said support means and extending through the perforated portion of said elongated element, spherical means on the stud in position to engage the spherical seat on one side of said perforated portion, and holding means encircling the stud in position to engage the mounting portion on the side thereof opposite from said seat in order to secure the perforated portion on said stud between said holding means and the spherical means.

7. A spirit level comprising an elongated element having spaced mounting portions, anchor means for connecting said mounting portions on support means, at least one of the mounting portions having a perforation providing a spherical seat facing away from said support means, said anchor means comprising a stud adapted to be threaded in said support means in position extending through the perforation of said mounting portion, spherical means on said stud in position to engage the spherical seat, and holding means comprising a yielding spring extending between the support means and the mounting portion having the perforation in order to yieldingly urge the elongated element axially on said stud and against said spherical means.

8. A spirit level comprising an elongated element having spaced mounting portions, at least one of which comprises a spherical seat, anchor means to connect said mounting portions on support means, and adjustable means operatively associated with said anchor means and comprising a spherical member engaging said seat for adjusting the mounting portions with respect to said anchor means.

9. A spirit level comprising an elongated element having spaced mounting portions, at least one of which portions comprises a spherical seat, anchor means to connect said mounting portions on support means, and adjustable means operatively associated with said anchor means and comprising a spherical member engaging said seat for adjusting the mounting portions with respect to said anchor means, said adjustable means comprising means to adjust at least one of the mounting portions of the elongated element axially on said anchor means as well as to adjustably shift at least one of said mounting portions laterally with respect to the anchor means.

10. A spirit level comprising a frame element having a perforated mounting portion providing a spherical seat on one side of the mounting portion, support means connected to said mounting portion and comprising an elongated threaded element adapted to be mounted in a base and project outwardly thereof and extend through the perforation of said mounting portion, spherical means carried by said elongated element and adapted to rockingly engage the spherical seat on one side of said mounting portion, and holding means encircling said elongated element and bearing upon the opposite side of said mounting portion to hold the spherical means in said spherical seat.

11. A spirit level as set forth in claim 10, wherein said holding means comprises a spring upwardly engaging the mounting portion and serving to urge the same in a direction on said elongated threaded element to yieldingly hold the spherical means in said seat.

12. A spirit level as set forth in claim 10 wherein said holding means comprises a nut threaded on said elongated element and adjustable thereon in position to engage the side of said mounting portion opposite from the spherical means, whereby to hold the same in said spherical seat.

13. A spirit level as set forth in claim 10 wherein said mounting portion is formed with an additional spherical seat and wherein the holding means comprises a spherical element on said elongated element and adapted to engage in said additional spherical seat, whereby to hold the mounting portion on said elongated element with the other seat in engagement with the spherical means.

14. A spirit level comprising a frame element having a perforated mounting portion at one end and a spherical mounting portion at its other end, means to secure the perforated portion adjustably in spaced relationship with respect to a supporting base comprising an elongated threaded element secured on said base and extending in the perforation of the mounting portion and means to secure the mounting portion on said elongated element, and support means forming a socket adapted for mounting on said base in position to receive the spherical mounting portion in said socket whereby to permit free tilting movement of the frame with respect to the socketed support when the spacement between the perforated mounting portion and the base is adjusted.

15. A spirit level comprising a frame element having a perforated mounting portion at one end and a spherical mounting portion at its other end, means to secure the perforated portion adjustably in spaced relationship with respect to a supporting base comprising an elongated threaded element secured on said base and extending in the perforation of the mounting portion and means to secure the mounting portion on said elongated element, support means forming a socket adapted for mounting on said base in position to receive the spherical mounting portion in said socket whereby to permit free tilting movement of the frame with respect to the socketed support when the spacement between the perforated mounting portion and the base is adjusted, and means to clamp the spherical mounting portion in said socket.

16. A spirit level comprising a frame element having a perforated mounting portion at one end and a spherical mounting portion at its other end, means to secure the perforated portion adjustably in spaced relationship with respect to a supporting base comprising an elongated threaded element secured on said base and extending in the perforation of the mounting portion and means to secure the mounting portion on said elongated element, support means forming a socket adapted for mounting on said base in position to receive the spherical mounting portion in said socket whereby to permit free tilting movement of the frame with respect to the socketed support when the spacement between the perforated mounting portion and the base is adjusted, and means to suspend the spherical mounting portion within said socket.

17. A spirit level comprising a frame element having a perforated mounting portion at one end and a spherical mounting portion at its other end, means to secure the perforated portion adjustably in spaced relationship with respect to a supporting base comprising an elongated threaded element secured on said base and extending in the perforation of the mounting portion and means to secure the mounting portion on said elongated element, support means forming a socket adapted for mounting on said base in position to receive the spherical mounting portion in said socket whereby to permit free tilting movement of the frame with respect to the socketed support when the spacement between the perforated mounting portion and the base is adjusted, said socketed support being constrictable upon said spherical mounting portion, and means operable to constrict the same in order to clampingly secure the mounting portion in said socket.

18. A spirit level comprising a frame element having a perforated mounting portion at one end and a spherical mounting portion at its other end, means to secure the perforated portion adjustably in spaced relationship with respect to a supporting base comprising an elongated threaded element secured on said base and extending in the perforation of the mounting portion and means to secure the mounting portion on said elongated element, support means forming a socket adapted for mounting on said base in position to receive the spherical mounting portion in said socket whereby to permit free tilting movement of the frame with respect to the socketed support when the spacement between the perforated mounting portion and the base is adjusted, and means to adjust the spherical mounting portion laterally in said socket.

19. A spirit level comprising a frame element having a perforated mounting portion at one end and a spherical mounting portion at the other, means to secure the perforated portion adjustably in spaced relationship with respect to a supporting base comprising an elongated threaded element secured on said base and extending in the perforated mounting portion, means to secure the mounting portion on said elongated element, and support means forming a socket adapted for mounting on said base in position to receive the spherical mounting portion in said socket whereby to permit free tilting movement of the frame with respect to the socketed support when the spacement between the perforated mounting portion and the base is adjusted, said socketed support having a sleeve-like portion including threaded means operable to constrict said sleeve-like portion upon said spherical mounting portion in order to clampingly secure the mounting portion in said socketed support.

20. A spirit level comprising a frame element having a perforated mounting portion at one end and a threaded socket at the other, a mounting element having a spherical portion and a threaded stem adapted for mounting in said threaded socket to present the spherical portion of said mounting element at the end of said frame opposite from the perforated mounting portion thereof, means to secure the perforated mounting portion adjustably in spaced relationship with respect to a supporting base, comprising an elongated threaded element mounted on said base and extending in said perforated mounting portion, means to secure the mounting portion on said elongated element, and support means forming a socket adapted for mounting on said base in position to receive the spherical portion of said mounting element whereby to permit free tilting movement of the frame with respect to the socketed support when the spacement between the perforated mounting portion and the base is adjusted along said elongated threaded element.

ADOLPH LANGSNER.